United States Patent [19]
Kiso

[11] Patent Number: 6,044,518
[45] Date of Patent: Apr. 4, 2000

[54] WIPER APPARATUS FOR VEHICLES

[75] Inventor: Takashi Kiso, Kiryu, Japan

[73] Assignee: Mitsuba Corporation, Kiryu, Japan

[21] Appl. No.: 09/079,363

[22] Filed: May 15, 1998

[30]    Foreign Application Priority Data

Jun. 10, 1997   [JP]   Japan .................................... 9-167969

[51] Int. Cl.⁷ ...................................................... A47L 1/00
[52] U.S. Cl. ....................................... 15/250.3; 15/250.31
[58] Field of Search ............................. 15/250.13, 250.16,
15/250.27, 250.3, 250.14, 250.31; 74/42,
526

[56]    References Cited

U.S. PATENT DOCUMENTS 5,119,523   6/1992   Unterborn .
5,287,585   2/1994   Yamamoto et al. .

FOREIGN PATENT DOCUMENTS 38 39 516      6/1989   Germany .
43 37 104 A1   5/1994   Germany .
Y2-55-30758    7/1980   Japan .
7-31526 U      6/1995   Japan .

*Primary Examiner*—Robert J. Warden, Sr.
*Assistant Examiner*—Kaj K. Olsen
*Attorney, Agent, or Firm*—Oliff & Berridge, PLC

[57]    ABSTRACT

A wiper apparatus having a swinging limiting device for limiting the further swinging of a link arm when the link arm reaches a limit of a swinging range. The swing limiting device being provided without increasing the number of parts of the wiper apparatus or requiring reinforcement of any parts. A limiting piece that makes up the swinging limiting device is formed to protrude from a first link arm and comes into contact with an edge portion of a first link rod plate-like section when the link arm swings past an upper turning position to reach the limit of the swinging range that exists slightly before the first link arm and a first link rod become aligned.

4 Claims, 7 Drawing Sheets

WIPER APPARATUS FOR VEHICLES

BACKGROUND OF THE INVENTION

1. Field of Invention

The invention relates to a vehicle wiper apparatus for use in trucks, passenger cars and other vehicles.

2. Description of Related Art

In general, one such vehicle wiper apparatus is equipped with a link rod reciprocating in its longitudinal directions in response to a driving force from a wiper motor, a wiper shaft fixedly holding a wiper arm and supported on a body side to be rotatable around its axis, and a link arm whose proximal portion is fixedly secured integrally to the wiper shaft and whose tip portion is pivotally supported by a tip portion of the link rod to be swingable, with the wiper arm of the wiper shaft being made to take reciprocating and wiping action in conjunction with reciprocative swinging movements of the link arm around the wiper shaft by reciprocating movements of the link rod.

The wiper apparatus is designed so that the rotation angle of the wiper shaft, that is, the swinging angle of the link arm, directly corresponds to the wiping swinging angle of the wiper arm, and a tendency is toward setting the swinging angle of the link arm to a large value for the purpose of securing a large window surface wiping area. On the other hand, in this case, there is a possibility that the swinging of the link arm exceeds the ordinary swinging range for some reason to pass the limits of the reciprocating swinging range, that is, to reach a supporting point crossing position exceeding a linear positional relationship between the link arm and the link rod. For this reason, in the prior art, a limiting means may be provided to regulate the swinging movements exceeding the reciprocating swinging range.

An apparatus including such a limiting means has been disclosed in Japanese Examined Utility Model Publication No. 55-30758 or in Japanese Unexamined Utility Model Publication No. 7-31526. In the former apparatus, a spring, having one end portion connected to a body side, is connected to a link rod at its other end portion to bias the link rod, approaching a reversal position, in a reversing direction, thereby restricting the swinging from going beyond the reversal position. In the latter, a stopper is provided on a sleeve fixed to a body side pivotally supporting a wiper shaft to be rotatable around an axis, and when an wiper arm reaches a position exceeding the limit of the reciprocating swinging range, the wiper arm engages with the stopper to limit swinging.

There is a problem which arises with the former device in that, in addition to the original parts, the spring is necessary thereby increasing the number of parts and the structure becomes complicated making assembly troublesome. Moreover, since the link rod is always biased by the spring, a large-sized wiper motor for outputting greater power is needed making it difficult to achieve the purpose of providing a compact structure that is light in weight.

On the other hand, in the latter apparatus, in limiting the swinging of the wiper arm, a large load is placed on the sleeve having the formed stopper. Hence, it is necessary the sleeve have a larger strength. For this reason, the sleeve is made by an aluminium die-cast. Recently, to obtain light weight, compactness and cost reduction, the sleeve has been made of a resin. However, in the case that the aforesaid swinging limiting stopper is formed integrally with the resin-made sleeve, sufficient strength is unobtainable and, therefore, it is not directly useable.

SUMMARY OF THE INVENTION

Accordingly, it is an object of the invention to eliminate the above-mentioned problems.

For this purpose, in accordance with the invention, a vehicle wiper apparatus comprises a link rod reciprocating in its longitudinal directions in response to a driving force from a wiper motor, a wiper shaft fixedly holding a wiper arm and supported on a body side to be rotatable around its axis, and a link arm whose proximal portion is fixedly secured integrally to the wiper shaft and whose tip portion is pivotally supported by a tip portion of the link rod to be swingable, with the link arm being made to take reciprocating and wiping action about or around the wiper shaft in conjunction with reciprocative movements of the link rod, wherein swinging limiting means for limiting the swinging of the link arm exceeding a limit of a reciprocative swinging range is placed between the link arm and the link rod.

With this structure, it is possible to eliminate the need for particularly reinforcing the sleeve, and a resin-made sleeve, that is light in weight, is employable.

In this case, in this invention, the swinging limiting means can make a swinging limitation in a manner that a limiting piece placed on the link arm or the link rod is brought into contact with the link rod or the link arm, with the result that it is possible to avoid an increase in the number of parts and to further simplify the structure.

BRIEF DESCRIPTION OF THE DRAWINGS

The object and features of the invention will become more readily apparent from the following detailed description of the preferred embodiments taken in conjunction with the accompanying drawings in which.

DETAILED DESCRIPTION OF PREFERRED EMBODIMENTS

Figure 1:
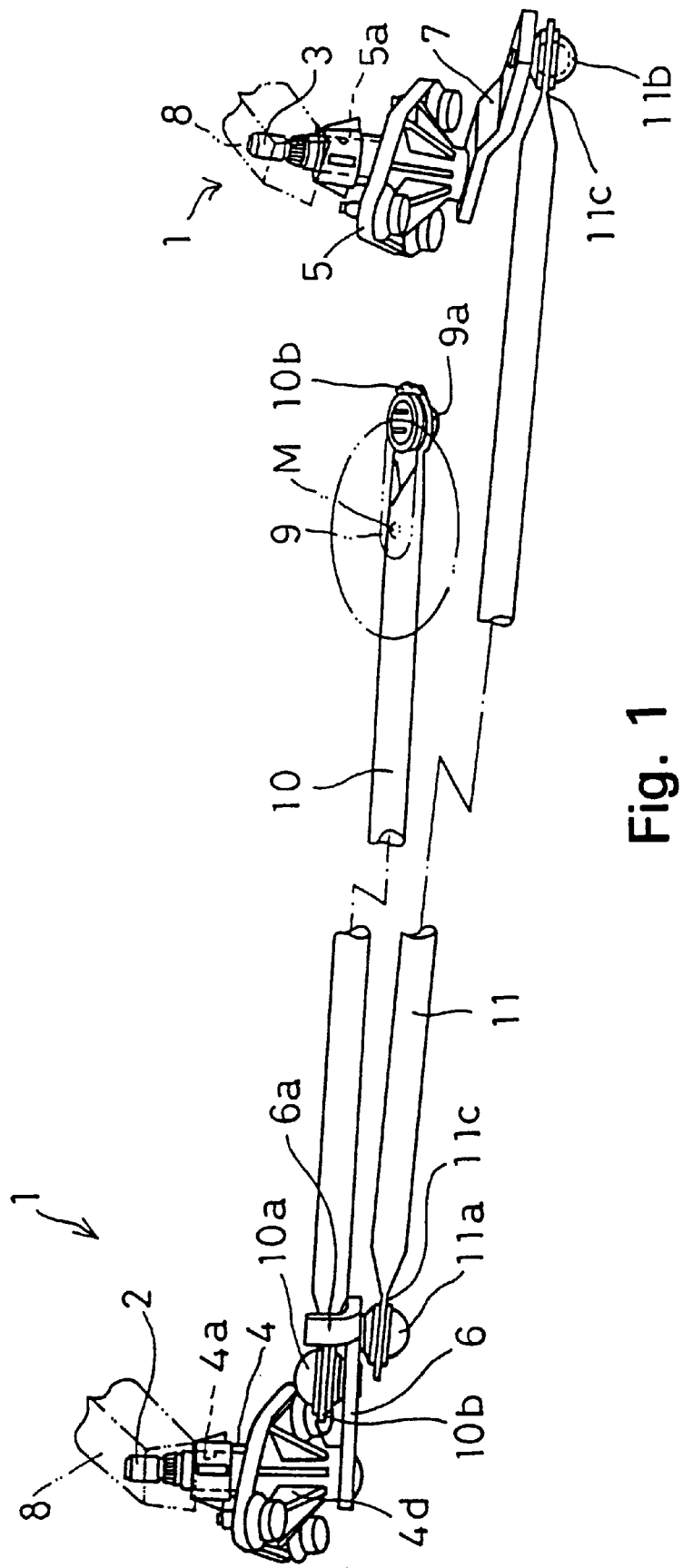
FIG. 1 is a front elevational view showing an wiper apparatus according to an embodiment of the invention.
Figure 2:
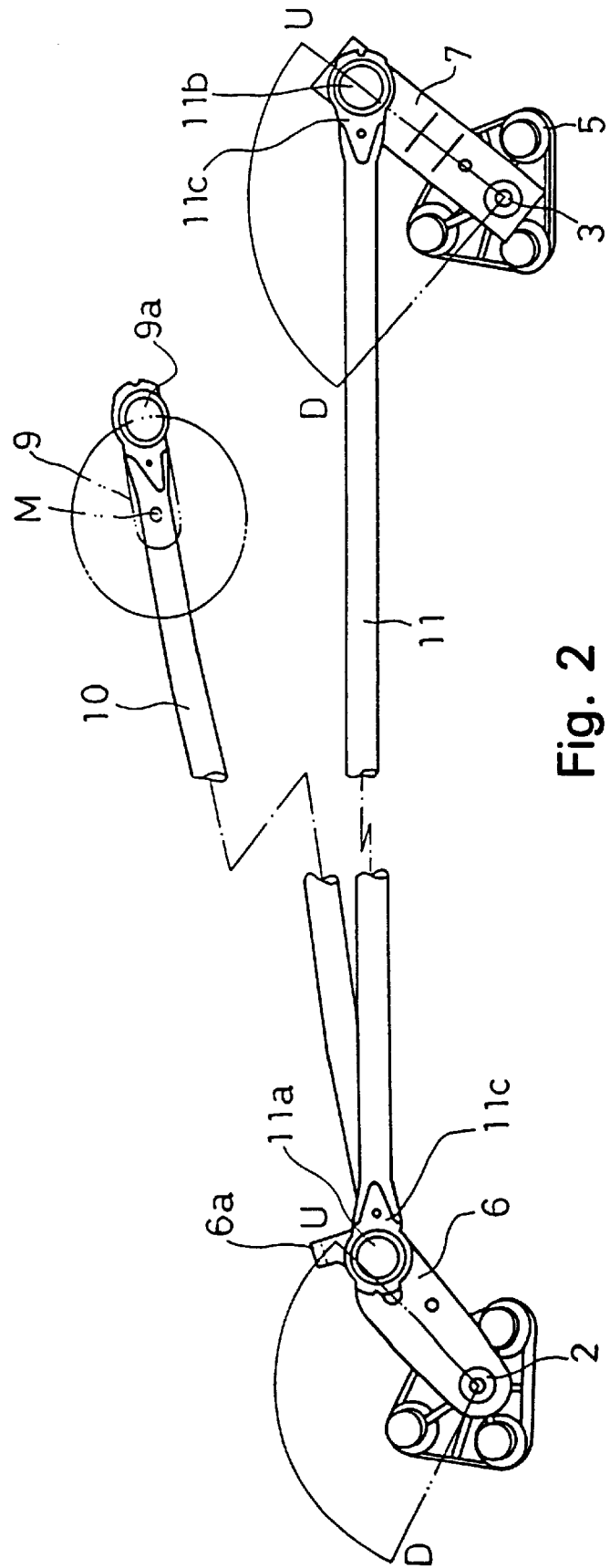
FIG. 2 is a bottom view showing the FIG. 1 apparatus.

An embodiment of the invention will be described hereinbelow with reference to FIGS. 1 to 6(B).

In the illustrations, designated at numeral 1 are a pair of left- and right-hand wiper apparatus to be mounted on a motor vehicle, a pair of first and second wiper shafts 2, 3 constituting the respective wiper apparatus 1 are respectively rotatably supported by tubular holes 4a, 5a made in first and second sleeves 4, 5 fixed to a vehicle body side being in an opposed relation to a driver's seat section and a passenger's seat section. Further, proximal portions of first and second link arms 6, 7, which will be described herein later, are caulked integrally at proximal portions of the wiper shafts 2, 3 protruding from the tubular holes 4a, 5a. Still further, the wiper shafts 2, 3 have tip portions respectively attached to blade-mounted wiper arms 8, and when the first and second link arms 6, 7 rock in a reciprocating way owing to a drive mechanism which will be described herein later, the blades are made to wipe a windshield glass.

In this embodiment, the first and second sleeves 4, 5 are made of a resin. Further, numerals 4b, 4c denote a washer for preventing the wiper shaft 2 from falling out and a stopper ring for avoiding the falling-out, while a similar structure is provided between the second wiper shaft 3 and the second sleeve 5.

A description will now be provided for the drive mechanism for each of the wiper apparatuses 1. Numeral 9 depicts a crank arm linked at one end with a wiper motor output shaft M fixedly secured to the body side. A first link rod 10 is swingably supported, through a ball joint 9a, by the other end portion of the crank arm 9. In addition, the opposite end portion of the first link rod 10 is swingably supported, through a ball joint 10a, and by an end portion of the first link arm 6 on one of the wiper shafts, i.e., the first wiper shaft (in this embodiment, the left-hand wiper shaft in FIG. 1) 2 side.

Moreover, the proximal end portion of a second link rod 11 is swingably supported, through a ball joint 11a, by the end portion of the first link arm 6, while the other end portion of the second link rod 11 is swingably supported, through a ball joint 11b, by the tip portion of the second link arm 7. In addition, in accordance with the rotational movement of the crank arm 9 caused by the driving of the motor (not shown), the first link rod 10 reciprocates in the rod longitudinal directions, whereupon the first and second link arms 6, 7 rotationally reciprocate in a state where the first and second wiper shafts 2, 3 serve as axes, so that both the wiper arms 8 swing between a lower turning position and an upper turning position to take wiping actions.

The arm members, including the first and second link arms 6, 7 and the crank arm 9, are made by pattern-cutting a metallic plate material and bending it, whereas the first and second link rods 10, 11 are respectively constructed with a pipe-like metallic material. Both end portions, of the first and second link rods 10, 11, acting as connecting portions with either the link arms 6, 7 or the crank arm 9, are flattened to form plate-like sections 10b, 11c. Further, the plate-like sections 10b, 11c are connected to the plate surfaces of the arms 6, 7 and 9 in a state of being in an opposed relationship to one other. Still further, a swinging limiting means, according to the invention, is placed between the first link arm 6 and the first link rod 10 of the connecting sections.

Figure 3:
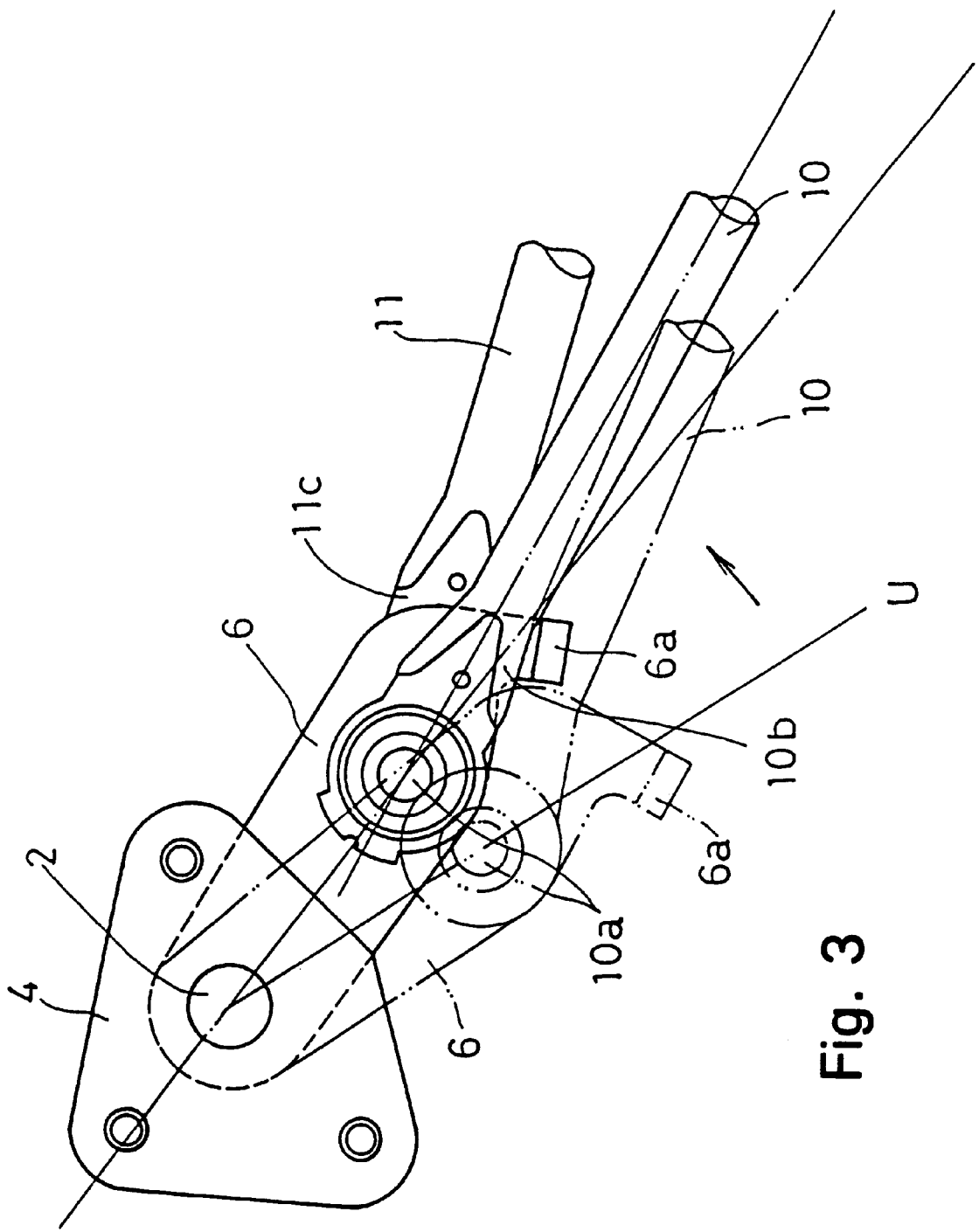
FIG. 3 is a plan view useful for explaining an operation of a principal section of the FIG. 1 apparatus.
Figure 4:
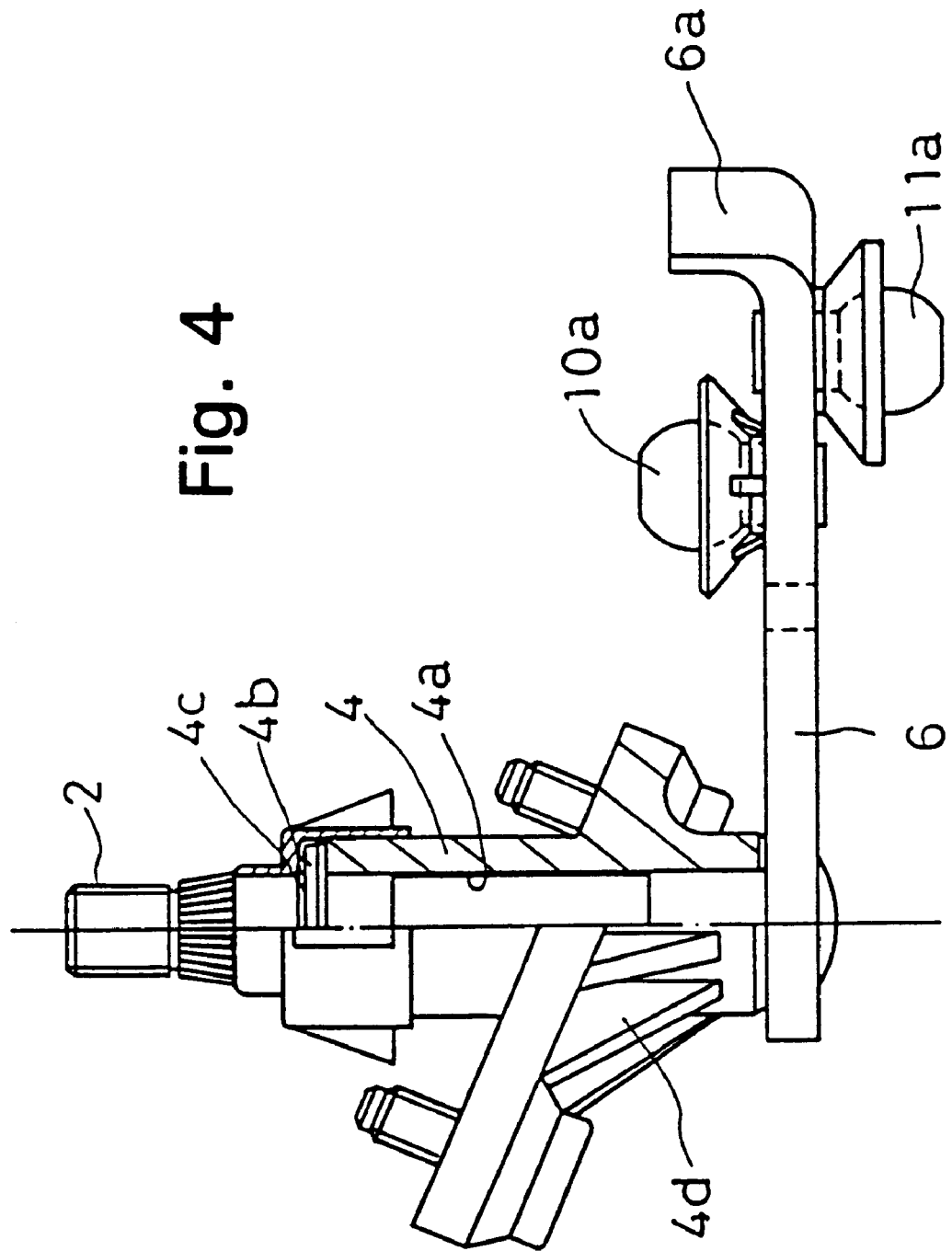
FIG. 4 is a partially cross-sectional and front-elevational view showing the principal section of the FIG. 1 apparatus.
Figure 5:
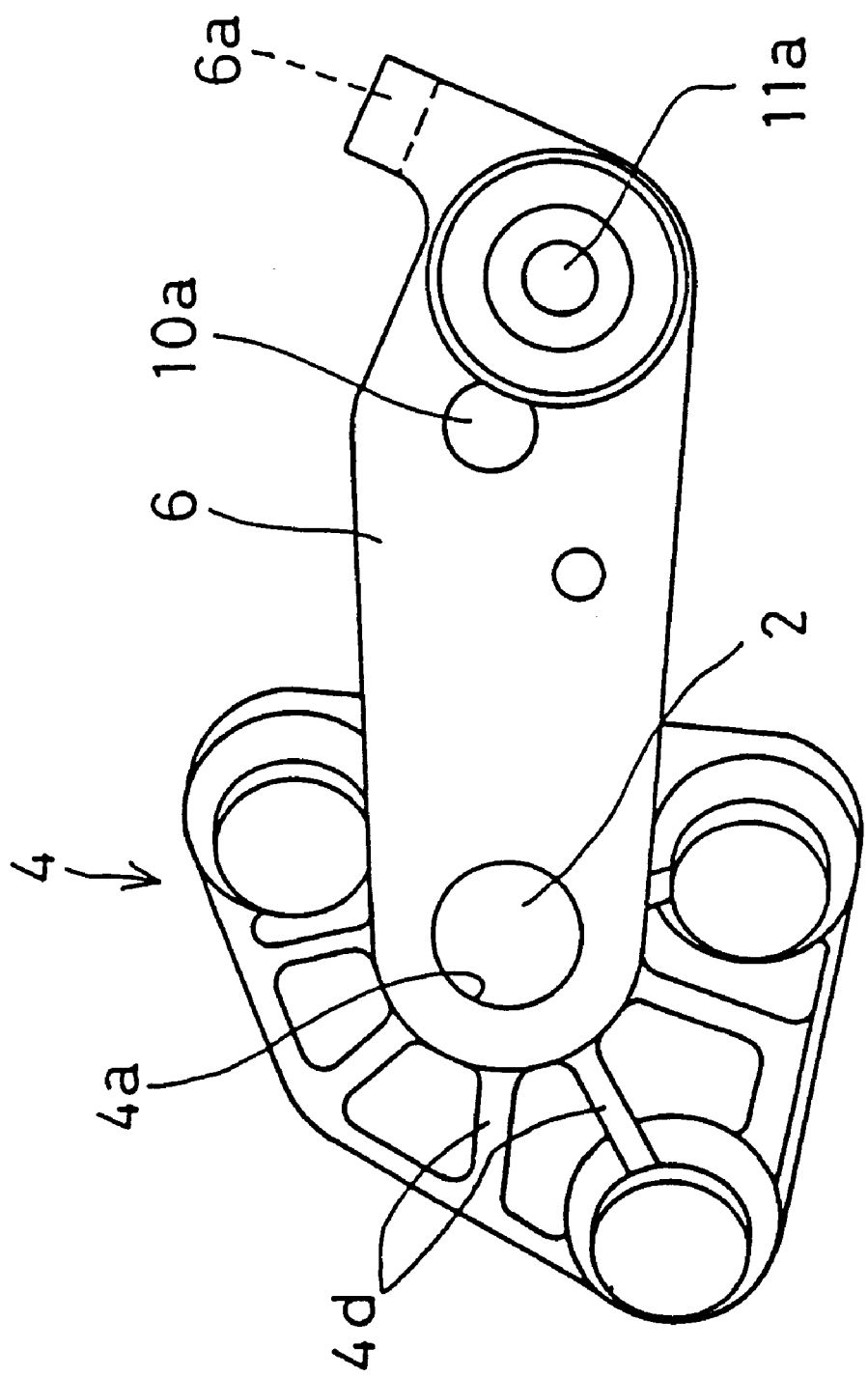
FIG. 5 is a bottom view showing the principal section of the FIG. 1 apparatus.
Figure 6A:
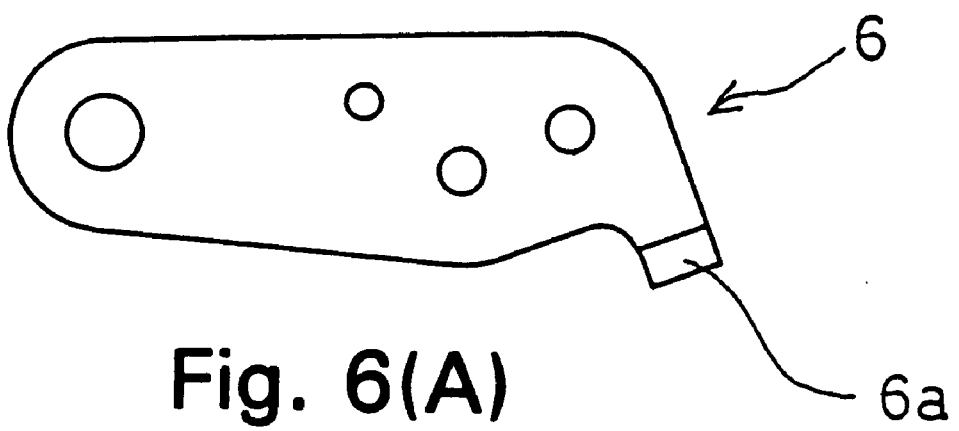
FIGS. 6(A) and 6(B) are respectively a plan view and a front elevational view each showing a first link arm.
Figure 6B:
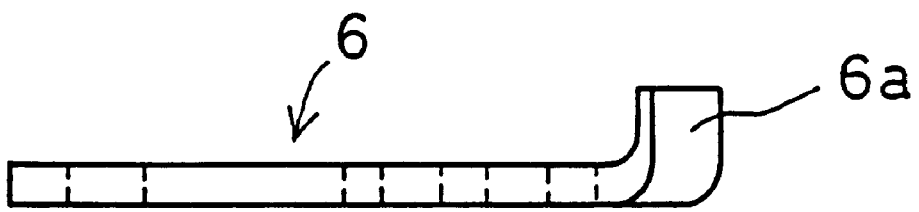
Figure 7:
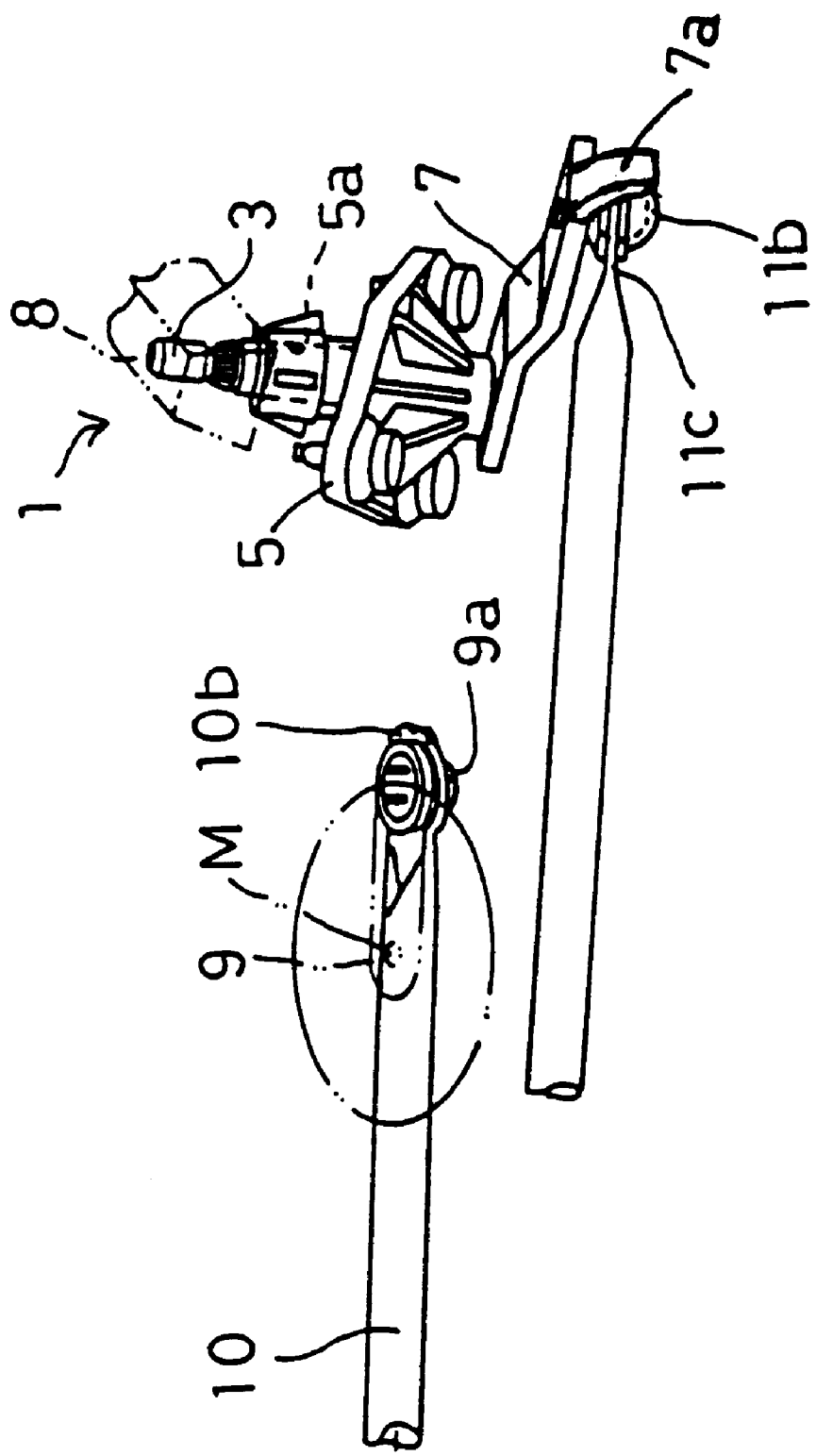
FIG. 7 is a partial view of a second embodiment.

More specifically, the end portion of the first link arm 6 is connected through the ball joint 10a to the first link rod 10 on one plate surface side, and is connected through the ball joint 11a to the second link rod 11 on the other plate surface side. In addition, the first link arm 6 is designed to swing between the upper turning position U (FIG. 2) and the lower turning position D in accordance with the reciprocating movements of the first link rod 10. Integrally formed at the end portion of the first link arm 6, having ball joints 10a, 11a on opposite plate surfaces thereof, is a limiting piece 6a that protrudes from the plate surface. The limiting piece 6a is bent in the direction of the connection side surface with the first link rod 10, of the first link arm 6, to make a substantially L-like configuration. The limiting piece 6a, when the first link arm 6 swings toward the upper turning position U, that is, the position where movement changes direction toward the lower turning position D, is located on the trailing side in the swinging direction, that is, the limiting piece is on the lower turning position D side of link arm 6. Moreover, when the first link arm 6 goes past the upper turning position U and swings in the same direction to reach the limit of the swinging range set as a position before the supporting point crossing position where the first link arm 6 and the first link rod 10 lie on a straight line, the limiting piece 6a contacts an edge portion of the first link rod plate-like section 10b, as shown in FIG. 3, to limit the further swinging of the first link arm 6. As noted above, the limiting piece 6a is formed on the trailing side in the swinging direction toward the upper turning position U side and, hence, does not interfere with the members comprising the driving mechanism, such as the first link rod 10, while the first link arm 6 operates in the common swinging range.

On the other hand, in this embodiment, the swinging limitation at the lower turning position D is provided by the first link rod 10 coming into contact with a reinforcing rib 4d formed on the first sleeve 4. It is also possible to provide a limiting means on the second link arm 7 as a second embodiment, having the same structure as that of the swinging limiting means 6a. The limiting means on the second link arm 7 would engage the link rod 11 at the lower turning position D. That is, a limiting piece 7a protruding toward the second link rod 11 connecting portion side is formed on the second link arm 7 so as to come into contact with the second link rod 11 at a position before the second link arm 7 and the second link rod 11 take a substantially linear position when swinging toward the lower turning position D side.

In the embodiment of the invention thus structured, the wiper arms 8 of the wiper apparatus 1 reciprocate to take wiping actions owing to the first and second link arms 6, 7 assuming the swinging actions in response to the motor driving forces, and when the wiper arm 8 goes past the ordinary upper turning position corresponding to the upper turning position U of the first link arm 6 for some reason to reach the limit of the swinging range, the limiting piece 6a protruding from the first link arm 6 is brought into contact with the first link rod 10 to limit any further swinging movement, whereupon it is possible to avoid the malfunction consisting of the supporting point crossing condition of the first link arm 6 and the first link rod 10. Further, in this case, the swinging limitation of the first link arm 6 is provided by the limiting piece 6a formed integrally on the first link arm 6. Therefore, unlike the prior art which uses a spring as a limiting member, the number of parts does not increase and, further, since the limiting piece 6a can be formed during processing of the first link arm 6, it is possible to simplify the structure and to reduce manufacturing costs.

In addition, during normal operation, the limiting piece 6a does not interfere with the driving mechanisms, such as the first link rod 10, the second link rod 11 and the first link arm 6 at all, but only interferes when reaching the limit of the swinging range. Therefore, during normal operation, no significant load is placed on the driving mechanisms which can eliminate the need for the use of a particularly large-capacity wiper motor.

Moreover, since the limiting piece 6a is formed integrally on the first link arm 6, which is made from a metallic plate material, and the swinging limitation is achieved in a manner that the limiting piece 6a comes into contact with the first link rod 10 formed of a metallic pipe material, unlike the prior art in which the swinging limitation is made in a manner that the arm head is brought into contact with the stopper provided on the sleeve, there is no need to reinforce the sleeve, and a resin-made sleeve may be used.

The invention is not limited to the above-described embodiment and, naturally, the limiting piece comprising the limiting means can also be formed on the link rod side, or another member can also be attached to at least one of the link rod and the link arm, and the limiting piece is positioned between the link rod and the link arm.

It should be understood that the foregoing relates to only a preferred embodiment of the invention, and that it is intended to cover all changes and modifications of the embodiment of the invention herein used for the purpose of the disclosure, which do not constitute departures from the spirit and scope of the invention.

What is claimed is:

1. A vehicle wiper apparatus, comprising:

a link rod reciprocating in its longitudinal directions in response to a driving force from a wiper motor;

a wiper shaft fixedly holding a wiper arm and supported on a body side to be rotatable around its axis;

a link arm whose proximal portion is fixedly secured integrally to said wiper shaft and whose tip portion is pivotally supported by a tip portion of said link rod to be swingable, with said link arm being made to convert reciprocating movements of said link rod into swinging action about said wiper shaft, and a limiting piece formed on one of said link arm and said link rod is brought into contact with the other one of said link rod and said link arm to limit further swinging of said link arm when said link arm reaches a limit of a reciprocative swinging range.

2. A vehicle wiper apparatus driven by a motor, the motor rotating a crank arm, comprising:

a link rod pivotally connected at one end to the crank arm, the link rod being substantially moved axially by rotation of the crank arm;

a wiper sleeve mounted to the vehicle;

a wiper shaft extending through the wiper sleeve for rotatable movement;

a link arm having one end fixedly mounted to one end of the wiper shaft and having the link rod pivotally mounted offset from but proximate to an opposite end; and a limiting piece extending from the offset portion of the opposite end of the link arm so as to engage the link rod and prevent an axis of the link rod and an axis of the link arm from becoming aligned.

3. The vehicle wiper apparatus according to claim 2, wherein the link arm is formed of a metal plate and the limiting piece is an extension from the link arm bent to substantially a right angle to the metal plate forming the link arm.

4. The vehicle wiper apparatus according to claim 2, further comprising:

another wiper sleeve mounted to the vehicle body;

another wiper shaft extending through the another wiper sleeve for rotatable movement;

another link arm having one end fixedly mounted to one end of the another wiper shaft; and another link rod having a first end pivotally mounted to an opposite end of the another link arm and a second end pivotally mounted to the first link arm.

* * * * *